United States Patent

[11] 3,632,888

[72] Inventor Arthur B. Glaser
East Orange, N.J.
[21] Appl. No. 889,253
[22] Filed Dec. 30, 1969
[45] Patented Jan. 4, 1972
[73] Assignee Bell Telephone Laboratories, Incorporated
Murray Hill, N.J.

[54] N-PATH FILTER USING SAMPLED DATA FILTER AS TIME-INVARIANT PART
6 Claims, 7 Drawing Figs.

[52] U.S. Cl. .......... 179/15 A, 178/50
[51] Int. Cl. .......... H04j 3/04
[50] Field of Search .......... 179/15 A; 178/50

[56] References Cited
UNITED STATES PATENTS 3,358,083 12/1967 Helm .......... 178/50
3,522,381 7/1970 Feder .......... 179/15 A

*Primary Examiner*—Ralph D. Blakeslee
*Attorneys*—R. J. Guenther and William L. Keefauver ABSTRACT: A time division multiplexed sampled data filter is used as the time-invariant part of an N-path filter. The use of a multiplexed sampled data filter alleviates the problem of closely matching the transmission characteristics of each of the N-paths.

INVENTOR
A. B. GLASER
BY Gerard E. Murphy
ATTORNEY

FIG. 4
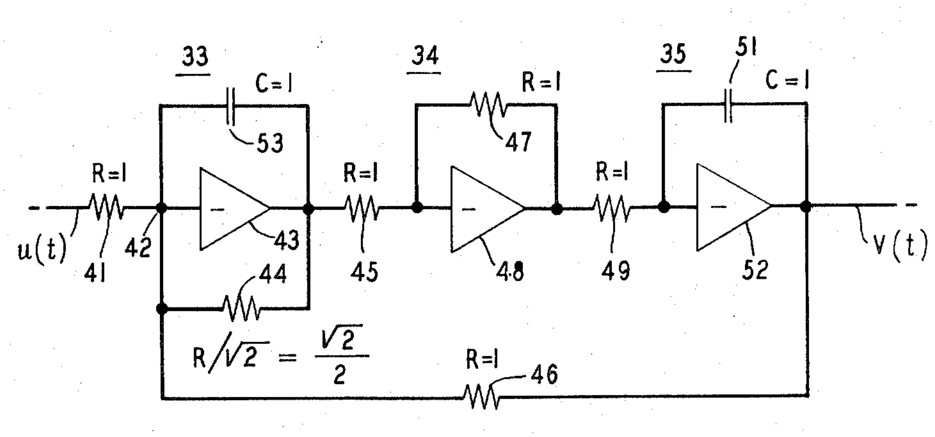
FIG. 5
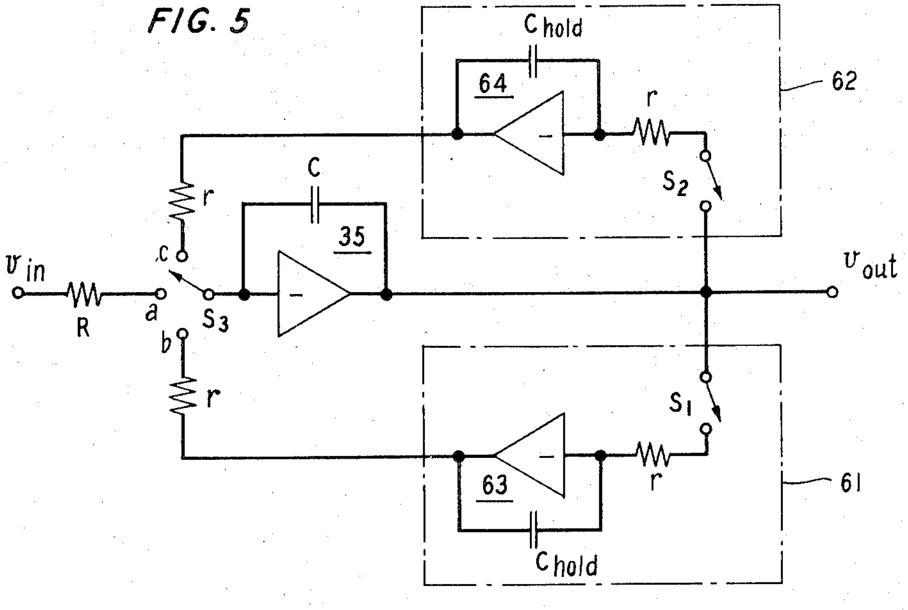
FIG. 6
SWITCH CONDITION
| | | | | |
|---|---|---|---|---|
| $S_1$ | CLOSED | OPEN | OPEN | OPEN |
| $S_2$ | OPEN | OPEN | CLOSED | OPEN |
| $S_3$ | POSITION $a$ | POSITION $c$ | POSITION $a$ | POSITION $b$ |
$kT$ $kT+T_1$ $(k+\frac{1}{2})T$ $(k+\frac{1}{2})T+T_1$ $(k+1)T$
TIME

N-PATH FILTER USING SAMPLED DATA FILTER AS TIME-INVARIANT PART

GOVERNMENT CONTRACT

The invention herein claimed was made in the course of, or under contract with the Department of the Army.

BACKGROUND OF THE INVENTION

1. Field of the Invention

This invention pertains to time-varying networks and, more particularly, to N-path filter networks.

2. Description of the Prior Art

Time-varying networks of the N-path filter-type have assumed a well-defined role in the network theory art. N-path networks are particularly advantageous because of their ability to provide band-pass transmission characteristics without the use of inductive elements. Such networks are thus amenable to realization by the new circuit technologies.

An N-path system generally comprises a time-invariant 2N-port network in cascade with input and output modulators. Typically, each path of the system comprises an input modulator, a time-invariant network, and an output modulator. The input and output modulating signals for each path are periodic, usually identical, and differ by fixed time delays from path to path. For an exhaustive discussion of such systems, see "An Alternative Approach to the Realization of Network Transfer Functions: The N-Path Filter," *Bell System Technical Journal*, Sept. 1960, pp. 1321–1350, and U.S. Pat. No. 3,081,434, issued to I. W. Sandberg on Mar. 12, 1963.

A major disadvantage of existing N-path filters is the requirement that the transmission characteristic of each path be substantially identical, in order that time-varying modulation products may be cancelled at the output of the N-path system by destructive interference. The use of N-path systems has been limited in the past because of this requirement.

It is, therefore, an object of this invention to overcome this serious limitation of prior art systems.

In my copending application Ser. No. 820,813, filed May 1, 1969, (A. B. Glaser 1) this limitation is overcome by using a multiplexed digital filter, thereby alleviating the need for a plurality of networks. Only one filter is utilized; thus, there is no necessity to match transmission characteristics of the time invariant networks since each signal propagates through the same network. Though eminently suitable in many circumstances, it has been found that the complexity of a digital filter and its associated analog-digital and digital-analog converters makes the use of such apparatus economically prohibitive in simpler systems.

It is, therefore, another object of this invention to economically time multiplex the time-invariant part of an N-path filter.

SUMMARY OF THE INVENTION

This and other objects of this invention are accomplished, in accordance with the principles of this invention, by utilizing an analog sampled data filter operating at a time rate that permits applied signals to be time division multiplexed, thereby alleviating the need for a plurality of networks. Because only one filter is utilized, there is no necessity to match transmission characteristics of the time invariant networks since each signal propagates through the same network. Furthermore, time division multiplexing is accomplished by storing physical quantities representative of the "state" of the system at predetermined intervals of time. Thus, a continuous time analog system serves as the filter processor for a plurality of sampled data paths or channels. Each channel uses the processor for a fraction of the sampling period and the "state" of the processor at the termination of this fractional period of time is "frozen" and stored in an analog memory until the commencement of the next appropriate sampling interval. It has been found that the effect of "freezing" the state of the system and storing it until the start of the next appropriate sampling interval is to reduce the natural frequencies of the sampled system. Stated another way, the effective time constants of the system are multiplied. This is a distinct advantage, particularly when the system is fabricated using integrated circuit techniques, since circuit time constants are proportional to physical circuit area.

Further features and objects of this invention, its nature and various advantages, will be more apparent upon consideration of the attached drawings and the following detailed description of the drawings.

BRIEF DESCRIPTION OF THE DRAWING

FIG. 4 is a schematic circuit of the filter shown in FIG. 3;

FIG. 5 depicts one integrator of the filter of FIG. 4 modified by the addition of apparatus for storing the state of the filter at predetermined intervals of time;

FIG. 6 illustrates in tabular form the condition of the switches used in the circuit of FIG. 5.

DETAILED DESCRIPTION OF THE INVENTION

Figure 1:
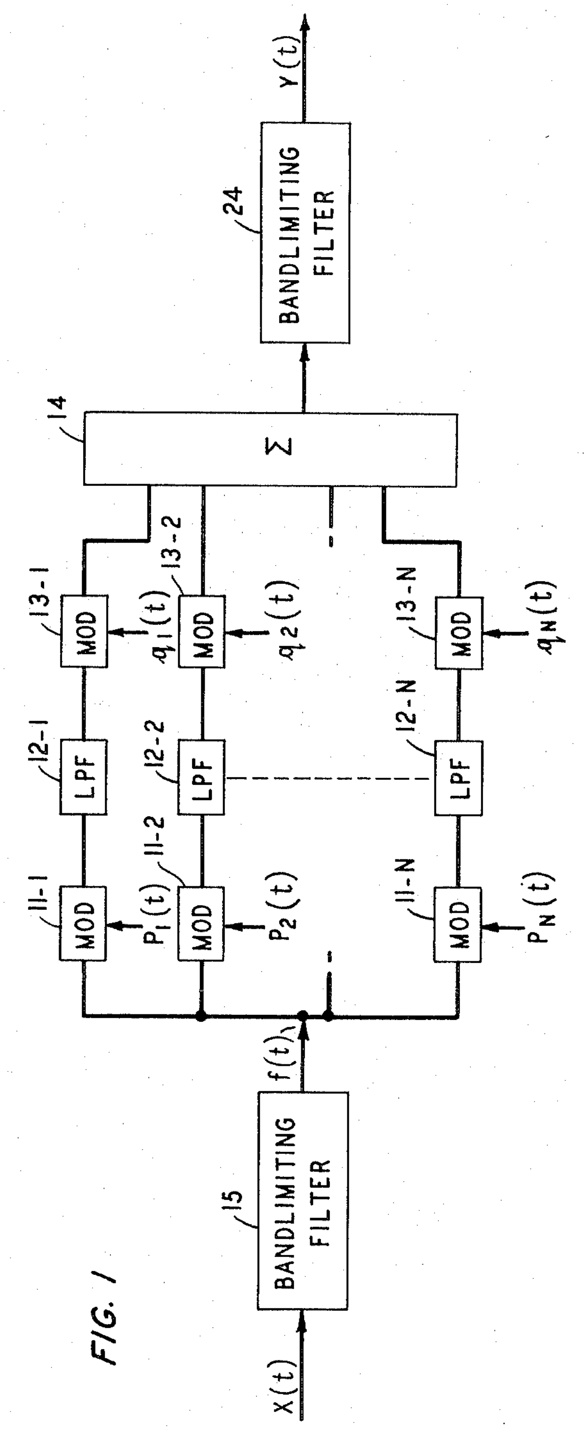
FIG. 1 illustrates a typical N-path filter system.

FIG. 1 depicts a conventional N-path filter of the type, e.g., disclosed in the aforementioned Sandberg patent. An applied input signal $x(t)$ is bandlimited by filter 15, modulated within N modulators 11–1 to 11–N, and each resultant modulated signal applied to a low-pass filter, 12–1 to 12–N, respectively. The output of each filter is modulated, respectively, within one of modulators, 13–1 to 13–N, after which all of the N processed signals are additively combined in combinatorial, i.e., summing, circuit 14 to develop an output signal $y(t)$ after filtering by apparatus 24. Modulating signals $p_1(t) \ldots p_N(t)$ and $q_1(t) \ldots q_N(t)$ may comprise a series of identical periodic waves displaced in phase by a factor T/N where T corresponds to the fundamental period, $2\pi/w_o$, of the waves $p(t)$ and $q(t)$, and N corresponds to the number of paths in the system. Since the transfer function of the depicted system may be represented by the transfer function of one of the low-pass filters 12, transposed in frequency and symmetrically centered about each of the frequency components of $p(t)$, the system exhibits the characteristic of a band-pass filter. One of the major problems in the implementation of the N-path filter, as shown, is the matching of the transmission characteristics of the paths. Ideally, each low-pass filter 12–1 to 12–N should be identical if time-varying modulation products are to be cancelled at the output of the system by destructive interference. Furthermore, the characteristic of each modulator and each path should likewise be identical. It will be recognized by those skilled in the art that such requirements are more easily realized in theory than they are in practice.

Figure 2:
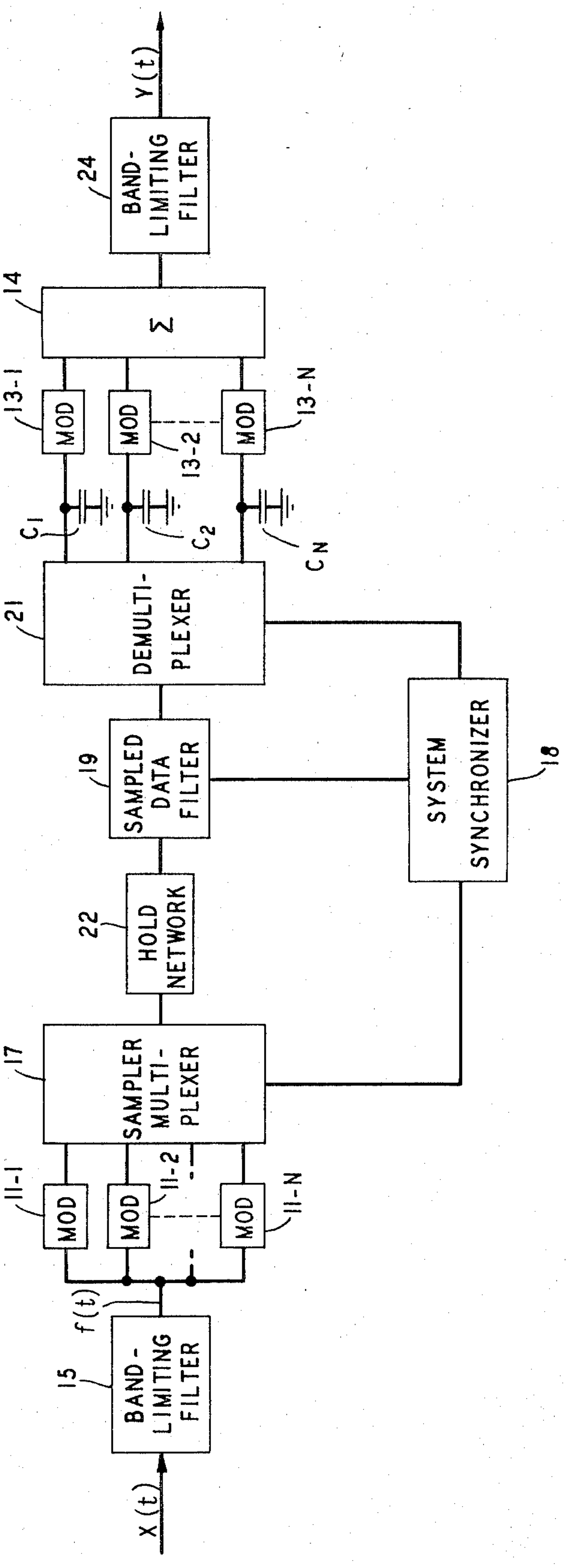
FIG. 2 illustrates the N-path filter system of this invention utilizing a multiplexed sampled data filter.

A system which overcomes these difficulties, in accordance with this invention, is illustrated in FIG. 2. An applied signal $x(t)$ is processed by bandlimiting filter 15 to remove undesired signal components. The filtered signal $f(t)$ is applied to a plurality of modulators 11–1 to 11–N which are identical in all respects to the input modulators depicted in FIG. 1.

The N modulated signals are applied to sampler-multiplexer 17. In a well-known fashion, apparatus 17, of any conventional type, samples, in turn, the N modulated signals at a predetermined sampling rate T, and develops a serial signal train of the various sample pulses which are stored between samples by hold network 22. These multiplexed stored sample pulses are applied to sampled data filter 19. Filter 19 processes the applied pulses in accordance with a predetermined filtering characteristic, a typical example of which will be discussed hereinafter. Filtered signals emanating from filter 19 are applied to demultiplexer 21 which, as the name implies, develops N parallel signal outputs corresponding to the filtered versions of the original N signals applied to apparatus 17. Synchronization between filter 19, sampler-multiplexer 17 and demultiplexer 21 is maintained, in a well-known manner, by timing signals developed by system synchronizer 18. Each one of the N output signals of demultiplexer 21 is applied to an appropriate shunt capacitor, $C_1$, $C_2$...$C_N$, which amplitude smooths the demultiplexed filtered signals. Conventional hold networks may be substituted for the capacitors, if so desired. Modulators 13–1 to 13–N, which are identical to the similarly identified modulators of FIG. 1, modulate each of the N signals; the modulated signals are then additively combined by network 14. The resultant signal is bandlimited by filter 24, to remove extraneous components, thereby developing the desired filtered output signal $y(t)$. Thus, it may be noted, the signals in each of the N-paths are processed by the same filter instead of by a plurality of similar filters. The only components that are not shared are the capacitors, (holding networks) and the output modulators. Accordingly, the problem of closely matching the transmission characteristics of diverse paths is alleviated.

In a typical case, each low-pass filter 12 of FIG. 1 has a second order all pole transfer function defined as follows:

$$H(s)=\frac{1}{s^2+1.41s+1} \quad (1)$$

Figure 3:
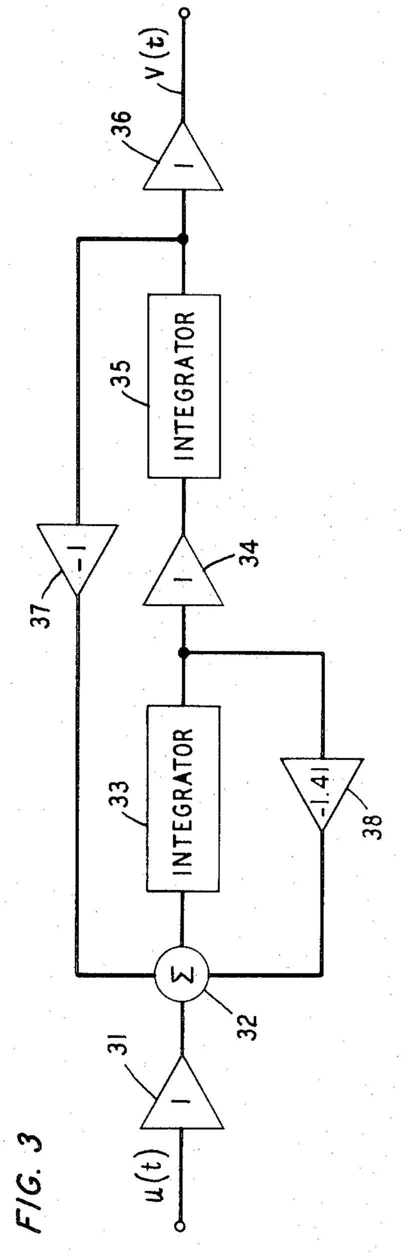
FIG. 3 is a block diagram of an analog computer implementation of a typical low-pass filter used in N-path filter systems.

A conventional analog computer implementation of this expression is shown in FIG. 3. The input signal $u(t)$ is summed, in summing network 32, with first and second integrals of the summed signal. Integration is performed by apparatus 33 and 35. Feedback, with appropriate multiplying coefficients to realize the desired transfer characteristic, is provided by amplifiers 37 and 38. A schematic circuit of the analog filter of FIG. 3 is shown in FIG. 4. Summing point 42 corresponds to summing network 32. Capacitor 53 in shunt with amplifier 43 functions as integrator 33 and resistor 44 provides the desired feedback represented by amplifier 38 of FIG. 3. Amplifier 48, in conjunction with resistors 45 and 47, corresponds to unity gain amplifier 34 and amplifier 52 in combination with resistor 49 and capacitor 51 functions as integrator 35. Feedback corresponding to the function of amplifier 37 is provided by feedback resistor 46.

If one attempts to apply a plurality of sampled, time multiplexed, input signals to the filter of FIG. 4, it is quite apparent that the desired multiplexed filter operation will not be accomplished. Consider, for example, that a signal $u_1(t)$ from channel 1 is applied to the input of FIG. 4. After a predetermined interval of time, it is desired that a second signal $u_2(t)$ from channel 2 be applied to the filter. However, the state of the storage devices, i.e., capacitors 53 and 51, will alter the response to $u_2(t)$ since signals are stored which are related to $u_1(t)$ rather than $u_2(t)$. Stated another way, the initial condition of the network for applied signal $u_2(t)$ corresponds, improperly, to the initial condition for the signals of channel 1. Furthermore, if the first channel signal $u_1(t)$ is subsequently applied to the filter network, the initial condition of state of the filter will correspond to the state of the storage devices, which is determined by all previously applied signals. It is therefore necessary, in order to properly multiplex such a filter, to store or "freeze" the state of the system at predetermined intervals of time and return the system to the proper state prior to the application of a channel signal which was initially responsible for the state which is stored.

In accordance with this invention input signals, for example, from each of the N channel modulators 11–1 to 11–N of FIG. 2, are sampled sequentially once every T seconds, a sampling interval which must satisfy the Nyquist criterion, and stored by network 22 of FIG. 2 for a time $T_1 = m\ T/N$, where $m$ is a predetermined fractional constant. The input to filter 19 of FIG. 2 is therefore a succession of rectangular pulses, each corresponding to a sample of one of the N channel signals, of duration $mT$. Filter 19 processes each applied signal pulse for an interval of time $T_1$, after which time the state of the system is frozen until an input sample pulse from the same channel is subsequently applied, whereupon the system is returned to the appropriate state for that channel signal. Thus, if there are N multiplexed channel signals, a new sample pulse is applied to the system every T/N seconds, a pulse of this amplitude is processed for a time $T_1$, and the instantaneous state of the system stored. The system is then returned to the appropriate state, which has been previously stored, prior to the application of the next succeeding channel pulse. Storage of the state of the system may be accomplished by sample and hold networks, one for each of the input channels, connected to the output of each integrator used in the filter. For example, if two signals are being multiplexed, two sample and hold circuits are required at the output of each integrator. One circuit stores the state of the integrator after an interval of time $T_1$ and the other stores the state of the integrator after an interval of time $T/2+T_1$. FIG. 5 depicts an integrator circuit 35 which is multiplexed between two input signals. Two sample and hold circuits 61 and 62, comprising switches S1, S2 and hold networks 63 and 64, respectively, shunt integrator 35. FIG. 6 illustrates in tabular form the various conditions of switches S1, S2 and input switch S3. Timing control circuits for the switches may be conventional and are not shown for reasons of clarity. Considering the beginning of an arbitrarily selected sampling interval commencing at time KT where K is any positive integer and T is the sampling rate, then for an interval of time $T_1$ switch S3 is in position $a$, switch S1 is closed, and switch S2 open. Thus, an applied signal, for example, from a first input channel, will be integrated by configuration 35 and the state of the integrator, i.e., the voltage appearing on capacitor C of integrator 35 stored by application of the capacitor voltage via switch S1 to hold network 63. At time $KT+T_1$ switch S1 opens, switch S2 remains open, and switch S3 moves to position C. Accordingly, the initial state of the system for channel 1 signals is isolated and stored by network 63 while a signal representing the state during a previous integration interval for signals of channel 2 is applied to integrator 35 by hold network 64 via switch S3. At time $(K+\frac{1}{2})T$ capacitor C of integrator 35 is properly charged; thus switch S1 remains open, switch S2 is closed, and switch S3 moves to position $a$. Accordingly, an applied signal from a second input channel will be processed by integrator 35 and the state of integrator 35 continuously monitored by hold network 64 via sampling switch S2. At time $(K+\frac{1}{2})T+T_1$ switch S1 remains open, switch S2 is opened, and switch S3 moves to position $b$ to charge capacitor C of network 35 to the appropriate initial condition for channel 1, i.e., the previous state of the system at time $KT+T_1$. Finally, at time $(K+1)T$ the above-described sequence commences again.

Figure 7:
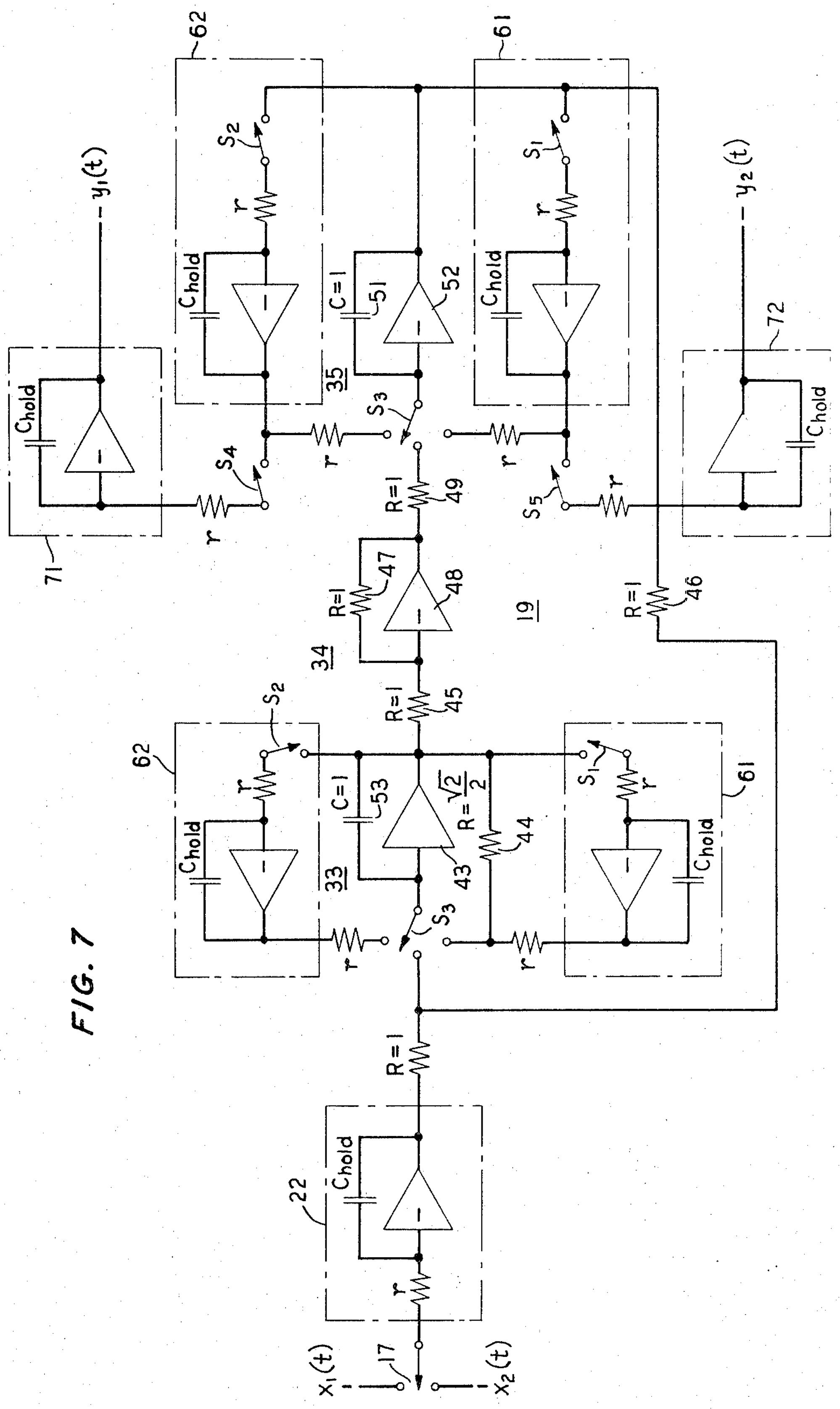
FIG. 7 depicts a multiplexed sampled data filter, in accordance with this invention, for use in an N-path filter system.

FIG. 7 illustrates a multiplexed sampled data filter in accordance with this invention. For purposes of clarity, only two input channel signals are illustratively considered; the processes disclosed, however, are evidently applicable to an N channel system, where N is an arbitrarily selected integer. Furthermore, switching control apparatus has not been shown to avoid unduly complicating the drawing; it may be, of course, of any conventional type. As illustrated in FIG. 7, two input channel signals $x_1(t)$ and $x_2(t)$, e.g., from modulators 11–1 and 11–2 of FIG. 2, are applied to switch 17 which functions as a sampler multiplexer. Hold network 22 stores a signal proportional to a sampled value of either $x_1(t)$ or $x_2(t)$ and applies one of these stored sampled signals for a period of time $T_1$ to sampled data filter 19. Filter 19 is substantially the same as the illustrative filter shown in FIG. 4; however, each of the integrator circuits 33 and 35 of FIG. 4 has been modified by the connection of shunting sample and hold networks 51 and 52 as shown in FIG. 5. The filtering process of filter 19 is substantially identical to that previously described (FIG. 4); the operation of sample and hold networks 61 and 62 is likewise identical to the operation of the sample and hold networks of FIG. 5, i.e., switches S1, S2, and S3 are activated in the manner shown in FIG. 6. All like components in FIGS. 2, 4, 5, and 7 have been identically numbered. Thus, integrator circuits 33 and 35 are returned to appropriate states, depending upon which of the individual channel input signals is applied. A predetermined interval of time after the application of a signal, i.e., $T_1$, the current state of the system is stored, and the condition of integrators altered in anticipation of the application of a signal from another channel. Output signals from filter 19 are conveniently available at the outputs of the sample and hold networks 61 and 62 shunting integrator 35. Switch S4 is activated at time KT and periodically, i.e., at the sampling rate, thereafter, to provide a filtered version of the input signal $x_1(t)$, while switch S5 is activated at time (K+½)T and periodically thereafter, at the sampling rate, to provide a filtered version of the input signal $x_2(t)$. Thus the filtered signal is easily demultiplexed. Hold networks 71 and 72 average out amplitude variations in the filtered signals. The resultant output signals $y_1(t)$ and $y_2(t)$ may thus be applied to modulators 13–1 and 13–2 of FIG. 2, if so desired.

It is to be understood the embodiments shown and described herein are illustrative of the principles of this invention only, and that modifications of this invention may be implemented by those skilled in the art without departing from the scope and spirit of the invention; for example, the functions performed by modulators 11, and sampler-multiplexer 17 may be simultaneously performed by apparatus of the type disclosed in my aforementioned copending application.

I claim:

1. A time-varying network comprising:
means for selectively modulating an applied input signal with a plurality of predetermined modulating signals;
means for developing multiplexed sample pulses of said modulated signals;
means for storing each of said multiplexed sample pulses for a predetermined interval of time;
multiplexed sampled data filter means for processing said stored multiplexed sample pulses;
means for demultiplexing pulses processed by said sampled data filter; and
means for selectively demodulating said demultiplexed pulses.

2. The time-varying network defined in claim 1 wherein the state of said sampled data filter means is periodically sampled and stored at first predetermined intervals of time and wherein said filter is returned to said stored state at second predetermined intervals of time.

3. The time-varying network defined in claim 1 wherein said sampled data filter comprises:
analog filter means having a predetermined transfer characteristic and including at least one storage device;
auxiliary storage means for storing an applied signal;
means for selectively applying the signal developed across said storage device to said auxiliary storage means at first preselected intervals of time; and
means for applying the signal stored by said auxiliary storage means to said storage device at second preselected intervals of time.

4. An N-path filter comprising:
means for simultaneously modulating an applied input signal with a plurality of predetermined modulating waves;
means for developing sample pulses of said modulated signals;
means for time multiplexing said sample pulses;
multiplexed sampled data filter means for processing said multiplexed sample pulses;
means for demultiplexing pulses processed by said sampled data filter; and
means for demodulating said demultiplexed pulses; and
means for selectively combining said demodulated demultiplexed pulses to develop a filtered version of said input signal.

5. The N-path filter as defined in claim 4 wherein the state of said multiplexed sampled data filter means is periodically sampled and stored at first predetermined intervals of time and wherein said filter is returned to said stored state at second predetermined intervals of time.

6. The N-path filter as defined in claim 4 wherein said multiplexed sampled data filter comprises:
analog filter means having a predetermined transfer characteristic and including at least one storage device;
means for periodically applying said sample pulses to said analog filter means;
auxiliary storage means for storing a signal proportional to the signal developed across said storage device;
means for selectively applying the signal developed across said storage device to said auxiliary storage means at first periodic intervals of time; and
means for applying the signal stored by said auxiliary storage means to said storage device at second periodic intervals of time.

* * * * *